United States Patent [19]

Hamane et al.

[11] 4,428,406

[45] Jan. 31, 1984

[54] METHOD OF SHAPING COIL ENDS OF AN ELECTRIC APPLIANCE

[75] Inventors: Tokuhito Hamane, Hirakata; Toshio Kinoshita, Katano; Masafumi Kihira, Hyogo, all of Japan

[73] Assignee: Matsushita Electric Industrial Co., Ltd., Osaka, Japan

[21] Appl. No.: 237,406

[22] Filed: Feb. 23, 1981

[51] Int. Cl.³ .............................................. B21F 1/00
[52] U.S. Cl. ..................................... 140/105; 29/596
[58] Field of Search ............... 140/71 R, 105; 29/596; 310/71, 254, 216

[56] References Cited

FOREIGN PATENT DOCUMENTS

55-26077  2/1980  Japan ..................................... 29/596

Primary Examiner—Francis S. Husar
Assistant Examiner—Linda McLaughlin
Attorney, Agent, or Firm—Wenderoth, Lind & Ponack

[57] ABSTRACT

Method and apparatus for shaping the coil ends for electric appliances wherein convex shapes are formed in the end portions of a plurality of types of coils, and the number or different shape of the convex shapes in each coil is selected to simplify the distinguishing of the plurality of end portions extending from each coil from each other and to prevent wiring errors in the connection of the end portions.

5 Claims, 13 Drawing Figures

METHOD OF SHAPING COIL ENDS OF AN ELECTRIC APPLIANCE

BACKGROUND OF THE INVENTION

The present invention relates to a method of shaping the coil end for electric appliance and to an apparatus therefor. More particularly, the present invention relates to a method for shaping the end portions of coils of electric appliances into respective different forms in accordance with the coil winding instructions in order to prevent coil assembling process errors and the wiring errors during operations performed after completion of the coil, and an apparatus therefor.

Although the same color or color intensity of colored electric wire has been used in a conventional electric appliance coil wound round a stator core or the like to distinguish among a plurality of coil end portions, the operator is still likely to make errors in the wiring of the end portions to terminals or the like for the electric connection of the appliance.

SUMMARY OF THE INVENTION

An object of the present invention is to simplify distinguishing among a plurality of coil end portions which extend from each coil of an electric appliance having one type or a plurality of coils.

Another object of the present invention is to provide method for shaping the coil ends of coils of electric appliances comprising the step of bending the end portions into convex shapes to prevent coil assembling process errors and wiring errors in assembly operations to be performed after forming the coils and apparatus therefor, said convex shapes being formed in the end portions of a plurality of types of coils. The number of different shapes of the convex shapes in each coil is selected to simplify the distinguishing of the plurality of end portions drawn from each coil and to prevent wiring errors in the connection of the end portions to each other. The same convex portions can be provided in different ends to which are to be connected, thereby to indicate that the ends having the same convex portions are to be connected to each other, so that the wiring operation can be correctly and efficiently performed.

According to the present invention, there is provided a method of shaping coil ends for an electric appliance comprising the step of forming a plurality of coil end portions into the respective different shapes, in accordance with the winding order of the coils, whereby the different shaped coil end portions distinguish the individual coil end portions among the plurality of coil end portions of coils wound around a stator core or the like, and an apparatus for shaping the coil ends of an electric appliance, comprising a plurality of shaping pawls for shaping the coil end portions and a driving mechanism for selectively operating said plurality of forming pawls to shape the coil end portions during the winding of the coil.

These and other objects, features, aspects and advantages of the present invention will become more apparent from the following detailed description of the present invention when taken in conjunction with the accompanying drawings.

DESCRIPTION OF THE PREFERRED EMBODIMENTS

Before proceeding with the description of the embodiment, it is to be noted that like parts are designated by the same reference numerals throughout the drawings.

Figure 1:
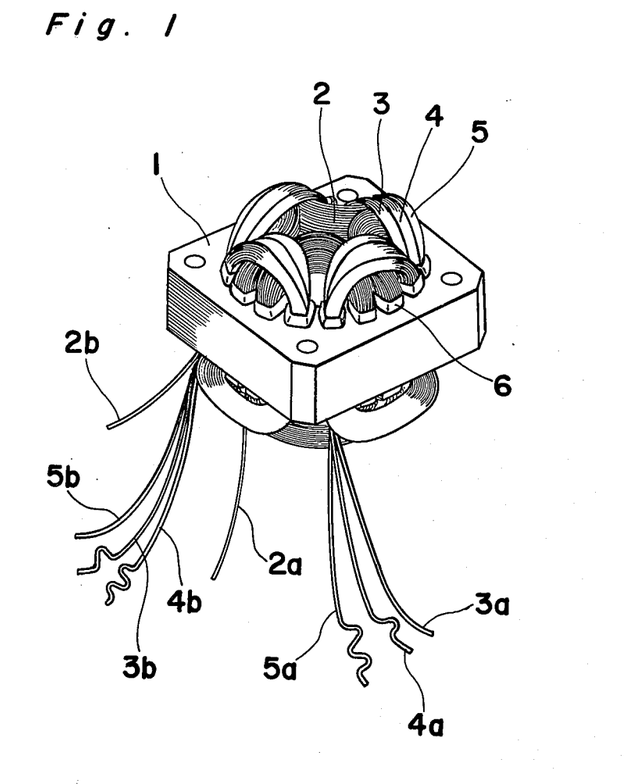
FIG. 1 is a perspective view of coil end portions formed by the method of forming coil end portions for electric appliances according to the present invention.

Referring to FIG. 1, a stator core 1 is provided with a main coil 2 having a leading end 2a and a trailing end 2b. Three types of auxiliary coils 3, 4 and 5 are provided within the stator core 1. The leading end portion 3a of the auxiliary coil 3 is provided with no convex portions. The trailing end portion 3b of the auxiliary coil 3 is provided with one convex portion. The leading end 4a of the auxiliary coil 4 is provided with one convex portion. The trailing end portion 4b of the auxiliary coil 4 is provided with two convex portions. The leading end portion 5a of the auxiliary coil 5 is provided with two convex portions. The trailing end portion 5b of the auxiliary coil 5 is provided with no convex portions. An insulator 6 is adapted to insulate the stator core 1, the main coil 2 and the auxiliary coils 3, 4 and 5. By counting the number of the convex portions, it is possible to distinguish the corresponding auxiliary coil to which each of the leading end portions 3a, 4a and 5a is connected. Similarly, by counting the number of the convex portions, it is possible to distinguish the corresponding auxiliary coil from which each of the trailing end portions 3b, 4b and 5b extends.

One embodiment of a coil trailing end forming apparatus for electric appliances in accordance with the present invention will be described hereinafter.

Figure 12:
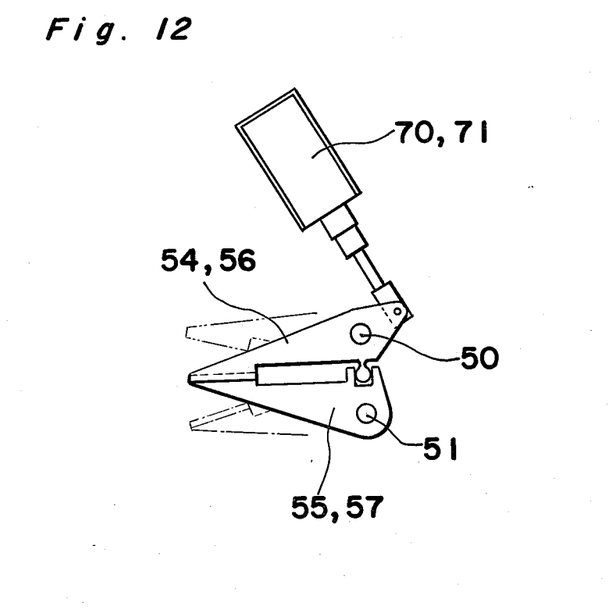
FIG. 12 is a side elevational view of forming levers of the apparatus of FIG. 2.
Figure 13:
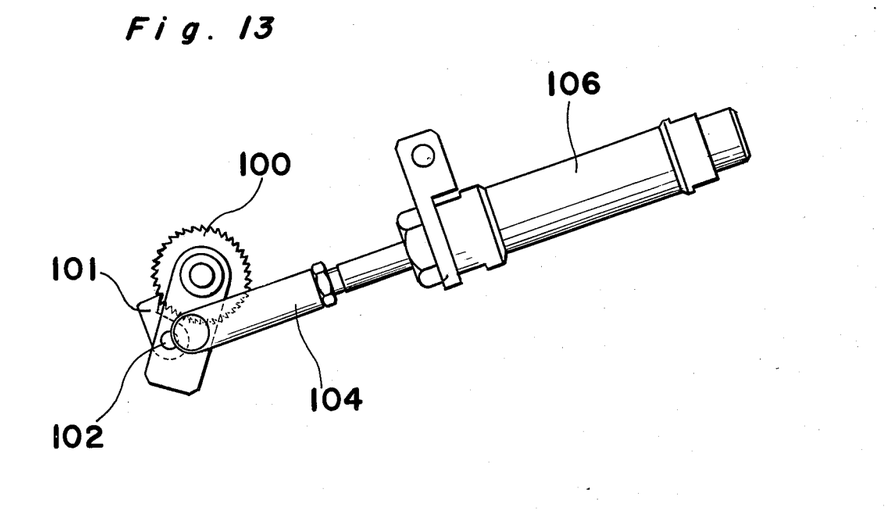
FIG. 13 is a plan view of a ratchet mechanism forming part of the apparatus of FIG. 2.

Referring to FIGS. 2 through 5 and FIGS. 12 and 13, a flyer 42 rotates round a spool 43 in a known manner, as described in U.S. Pat. No. 3,828,830 patented on Aug. 13, 1974. A nozzle 44 is secured to the flyer 42 to slidably guide the electric wire 45 toward the spool 43 from a rotary hook lever 86 as described later. As in the known construction as described within U.S. Pat. No. 3,872,897 patented on Mar. 25, 1975, there is provided a plurality of blades 46, and a coil accommodating space 47 for holding a coil 48 therein is provided in the form of a groove formed between a pair of adjacent blades 46, and an electric wire 45 is wound into a coil 48 around the spool 43 by the rotation of the flyer 42 so that it can drop into the coil accommodating space 47 in a known manner. A guide block 49 has a pair of cutting arms 52 and 53, and two pairs of forming levers 54 and 55 and 56 and 57 pivotally mounted thereon on shafts 50 and 51 as supporting points, respectively. Forming levers 54, 55, 56 and 57 are disposed between the cutting edges 62 and 63 and the clamp edges 60 and 61, and are normally open. A U-shaped groove 58 is located in the cutting arm 55 and a projection 59 is provided on the cutting arm 54. The projection is engaged into the U-shaped groove to open or shut the arms 52 and 53 in synchronous relation as shown in FIG. 12. Clamp edges 60 and 61 and cutting-edges 62 and 63 are respectively disposed on the cutting arms 52 and 53 to form a knife. Similarly, the forming levers 54 and 55 and the forming levers 56 and 57 are provided, respectively, with the U-shaped groove 58 and the U-shaped projection 59 engaged with each other so that they can be respectively opened or shut in synchronous relation. A concave-shaped shaping portion 54a and 56a is provided at the tip end of the respective forming levers 54 and 56. A convex-shaped shaping portion 55a and 57a is provided at the tip end of the respective forming levers 55 and 57. At the time of closure, the convex portion projects into the concave portion with a gap being provided between the forming levers 54 and 56 to shape a wire 45. A compression spring 66 normally urges the forming levers 54, 55, 56 and 57 in the opening direction through connectors 67 and 68 and a pin 69. Solenoids 70 and 71 are adapted to operate the forming levers 54 and 56 in the direction for closing these forming levers against the force of spring 66. A rod 72 is coupled at both ends to a lever 75 and the cutting arm 52 through rod ends 73 and 74. The lever 75 is rotatably supported on a mounting bracket on the shaft 76 as a supporting point and is coupled at its one end to the rod end 74 which is coupled to the cutting arm 52 through the rod 72 and the rod end 73. A follower 77 is provided at the middle portion of the lever 75 in contact with an end face cam 78 which is provided to rotate with the hook lever 86 through a shaft 87. A tension spring 79 is adapted to depress the cam follower 77 against the end face cam 78. A wire clearing rod 80 is secured to a lever 81, which is rotatably supported on the guide block 49 on the shaft 51 as a supporting point. A solenoid 82 is adapted to operate the lever 81 through a rod 83, a connector 83a and a pin 84. A compression spring 85 is adapted to urge the rod 80 in the direction L opposite to the operating direction of the solenoid 82. The hook lever 86 is secured to the lower end of the shaft 87 which is rotatably supported on the guide block 49 by bearings 88. The hook lever 86 is provided at its one end with a hook 86a and is secured at its other end to the shaft 87. The shaft 87 performs intermittent rotation through 180° in the direction of arrow B to rotate the hook lever 86 from a position A to a position B or from a position B to a position A. The shaft 87 is provided, at its top portion, with a small gear 89 having the end face cam 78 secured to the shaft. A large gear 90 is engaged with the small gear 89 at a 3:1 tooth ratio and is rotatably supported on a spline shaft 92 by bearing 91. The spline shaft 92 is, at its top portion, rotatably supported on a main body case 93 in bearing 94 and is engaged, at its bottom portion, with the spline groove of the large gear 90 for free vertical sliding motion. A disc 95, which is provided, on its under face, with six countersinkings 99 equally spaced in the peripheral direction, is secured to the spline shaft 92. A steel ball 96 is engaged with the countersinking 99 of the disc 95 by a compression spring 98 disposed in a hole provided in a stationary disc 97 thereby to position the disc 95 to which a ratchet wheel 100 is secured. A pawl 101, which is contained within a lever 103, is rotatably supported on the spline shaft 92 with a pin 102 as a supporting point to rotate the ratchet wheel 100 in one direction. A connector 104 is adapted to oscillate the lever 103, through a pin 105, by a cylinder 106. A thrust bearing 107, which is provided on the top face and the bottom face of the lever 103, supports the thrust of the connector 104. A link 108, which secures a cylinder 106, is rotatably supported on a mounting plate 110 by a pin 109. A cylinder 111 is secured to the mounting plate 110 by a bolt 12, and the rod tip end portion is secured to the guide block 49 by a connector 113. The mounting plate 110 is secured to the main body case 93. A slide shaft 114 is secured, at its shaft end, to the main body case 93 and a plate 115 thereby to slidably guide the guide block 49 between the main body case 93 and plate 115. The main body case 93, which is supported in the direction of an arrow G or H by a support shaft 116 and in the direction of an arrow I or J by a shaft 117, is secured to a main body plate 119 of the apparatus by a bracket 118.

Figure 2:
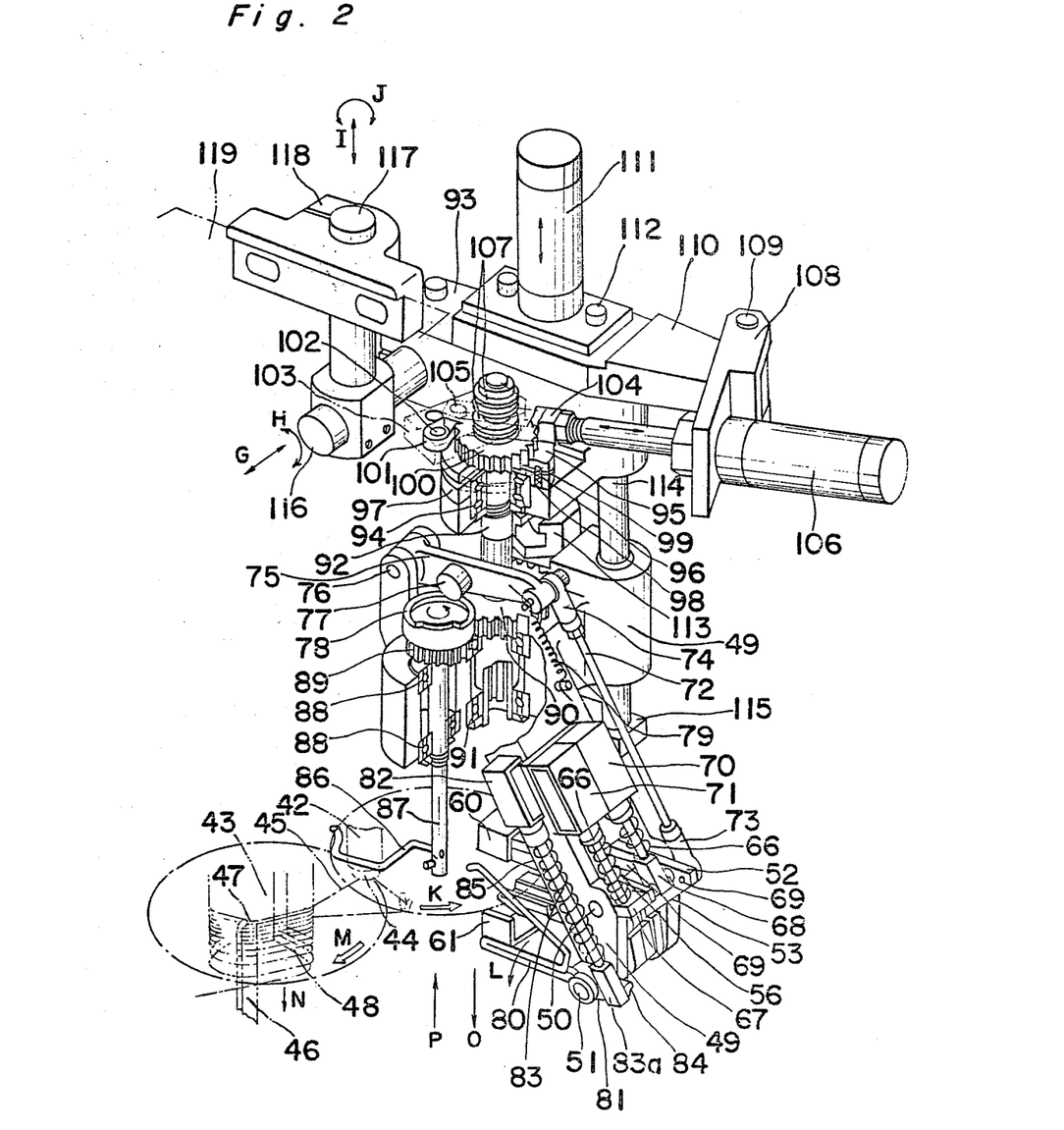
FIG. 2 is a perspective view of a wire cutting apparatus for cutting coil end portions in one embodiment of the present invention.
Figure 3:
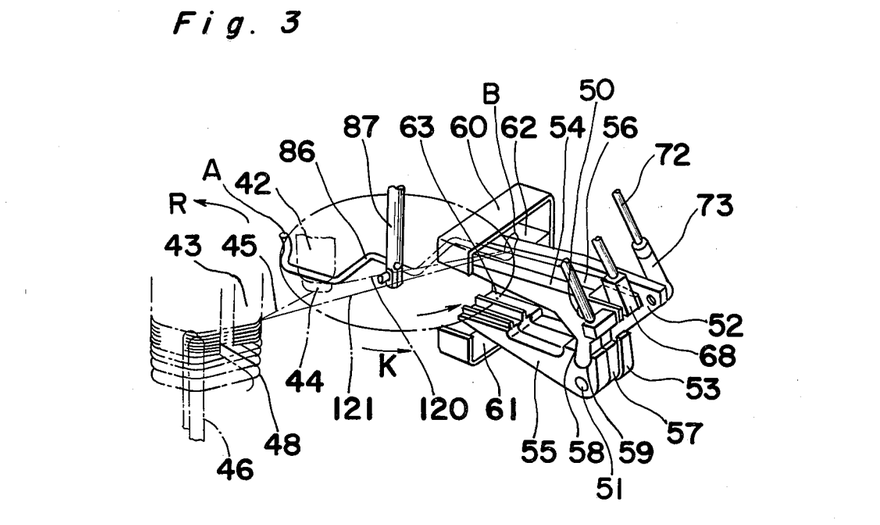
FIG. 3 is a perspective view of the portions of the apparatus of FIG. 2.
Figure 4:
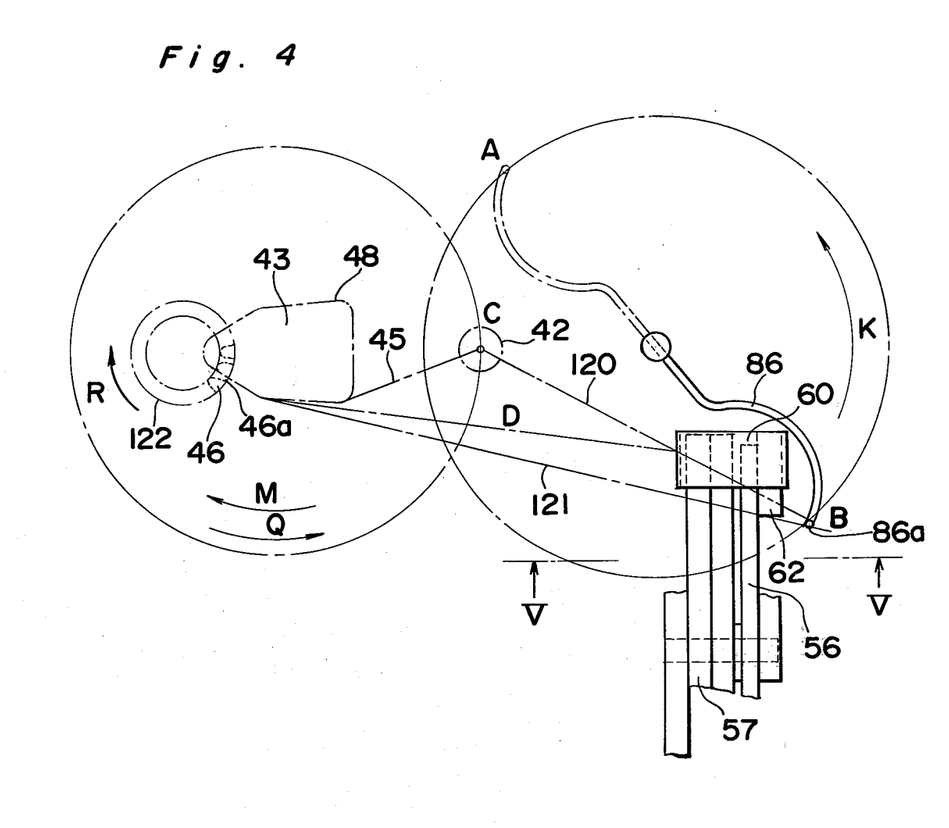
FIG. 4 is a schematic plan view of the portions of FIG. 3.

The cutting operation of the wire 45 and the clamp operation will be described hereinafter with reference to FIG. 2 through FIG. 4. Upon completion of the winding operation of the coil 48 round the spool 43 in a known manner, the cylinder 106 is operated to oscillate the lever 103 thereby to rotate the ratchet wheel 100 60° in the direction of the arrow K. During this period, the hook lever 86 is rotated 180° from the position A in the direction of the arrow K. Referring to FIG. 3, the hook lever 86 catches, between the spool 43 and nozzle 44, at its hook end the electric wire 45 leading from the spool 43 to the nozzle 44 of the flyer 42. As shown in FIG. 4, the hook lever 86 passes through, in order, the rod 80, the clamp edges 60 and 61, the forming levers 54 and 55, 56 and 57, the cutting arms 52 and 53 and the cutting edges 62 and 63 and come to the position B to position the electric wire 45 in a position to be cut. This part of the electric wire 45 becomes a terminal wire 120, which leads from the nozzle 44 of the flyer 42 to the hook lever 86, and a terminal wire 121 which leads from the coil 48 to the hook lever 86. The terminal wire 120 is located between the cutting edges 62 and 63, and the clamp edges 60 and 61. When the hook lever 86 passes between the cutting arms 52 and 53, the cam follower 77 comes into contact against the land of the end face cam 78 to oscillate the lever 75 to close the cutting arms 52 and 53 through the rod 2. The terminal wire 120 is cut off by the cutting edges 62 and 63 and is clamped by the clamp edges 60 and 61 by the operation of solenoids 70 and 71. The coil 48, which has a cut terminal wire 121, is moved between the blades 46 and 46 of a coil receiving jig 122. At this time, the solenoid 82 is operated to oscillate the rod 80 in the direction of the arrow L to clear the terminal wire 121. In the case of a motor coil with four polarities, when the coil 48 is removed from the spool 43, the coil receiving jig 122 rotates 90° to wind the coil round the spool 43 again. The terminal wire 120, which has been released from the nozzle 44 of the flyer is retained at its one end by the clamp cutting-edges 60 and 61. The coil 48 is formed of the electric wire 45 on the spool 43 by the rotation of the flyer 42 in the direction of the arrow M. Then, the wound coil 48 including terminal wire 120 moves downwardly together with the blades 46 in the direction of an arrow N. At this time a cylinder 111 is operated to lower the guide block 49, with the clamp edges 60 and 61 therein, in the direction of the arrow O. Upon the operation of the cylinder 106 to the descent position, the hook lever 86 rotates 180° to come to the position A. During this period, the end face cam 78 rotates simultaneously with the hook lever 86. The cam follower 77 secured to the lever 75 moves to the groove of the end face cam 78 to open the clamp edges 60 and 61 secured to the cutting arms 52 and 53 thereby to release the terminal wire 120. Thereafter, the cylinder 111 reversely operates to rise in the direction of arrow P and is restored to its original condition. The operation for shaping the coil end will be described hereinafter.

Figure 5:
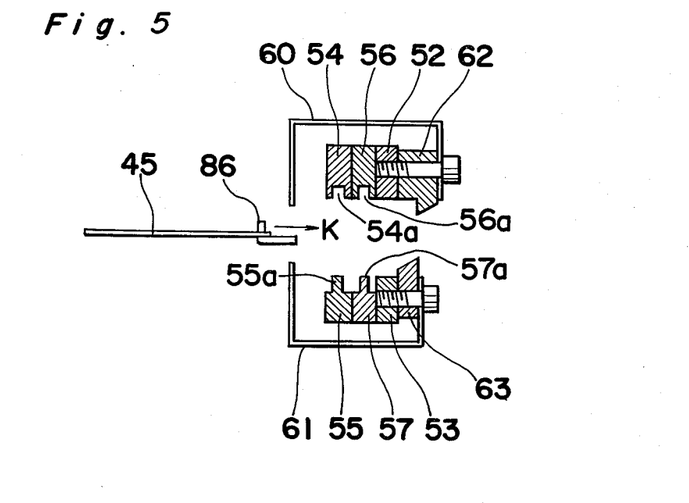
FIG. 5 is a cross-sectional view of essential portions taken along a line V—V of FIG. 4.
Figure 6:
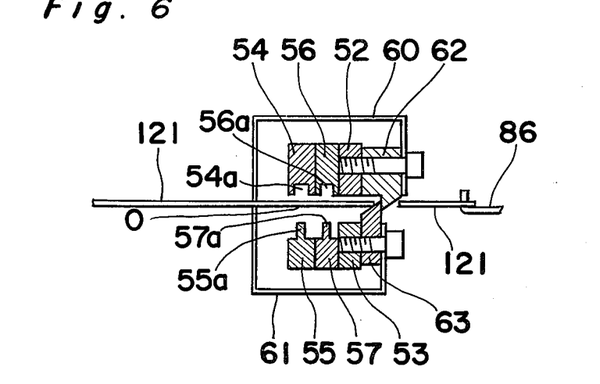
FIG. 6, FIG. 7 and FIG. 8 are cross-sectional views each illustrating the respective coil-end shaping actions of the structure of FIG. 5.
Figure 7:
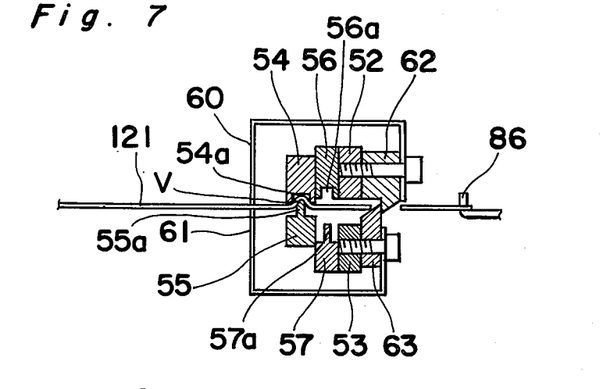
Figure 8:
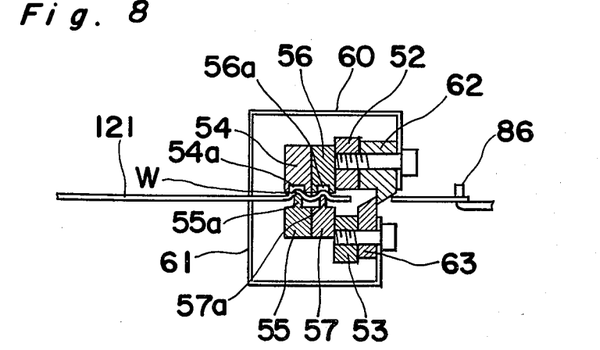
Figure 9:
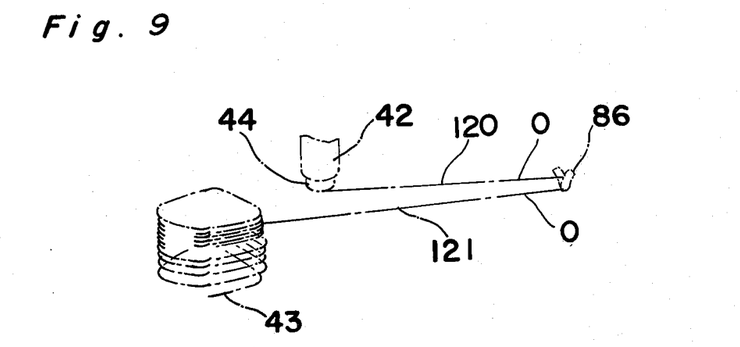
FIG. 9, FIG. 10 and FIG. 11 are views illustrating the respective coil-end shapes formed by the action of the structures of FIG. 6, FIG. 7 and FIG. 8, respectively.
Figure 10:
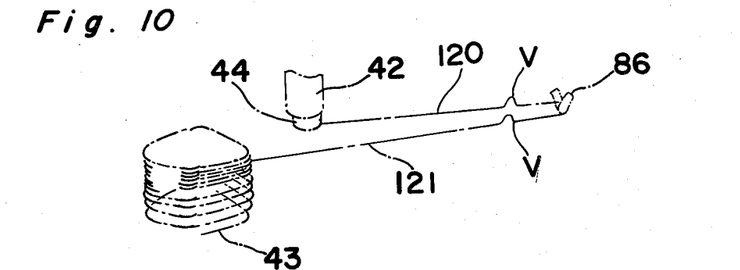
Figure 11:
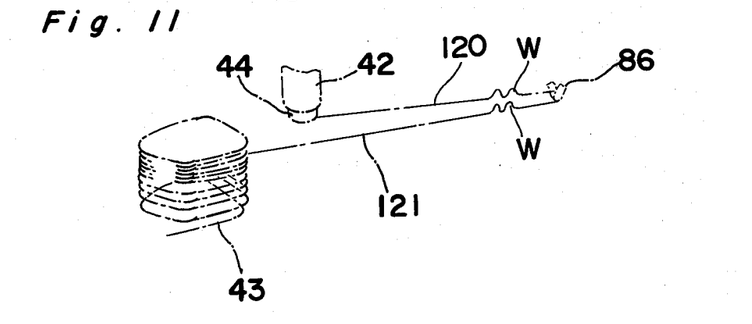

The coil in one embodiment of the present invention has four polarities. The end portions 3a, 3b, 4a, 4b, 5a and 5b, the auxiliary coils 3, 4 and 5 of FIG. 1, are positioned the concave-shaped forming cutting-edges 54a, 56a of the forming levers 54 and 56, and the convex-shaped forming cutting-edges 55a, 57a of the forming levers 55 and 57. One type of auxiliary coil 3 is composed of four coils 48. The coil winding operation of the auxiliary coil 3 will be described hereinafter. As shown in FIG. 3, the hook lever 86 is located in the position B. At this time, the leading end portion 120 leads from the nozzle 44 of the flyer 42, and is retained by the clamp edges 60 and 61. The leading end portion is not formed into the convex shape between the clamp edges 60 and 61, and between the cutting edges 62 and 63. Then, upon rotation of the flyer 42 in the direction of an arrow M, the electric wire 45 is delivered from the nozzle 44 and is wound around the spool 43 to form a coil 48, which is adapted to move to the coil accommodating space 46a. At this time, the leading end portion 120 is located at the position C. After winding of several turns of the electric wires 45 round the spool 43, the clamp edges 60 and 61 open to release the end portion 120, and the hook lever 86 pivots by 180° to come to the position of the A. Upon completion of the winding operation of a first coil 48, the coil 48 is accepted into the coil accommodating space 46a. A coil accepting jig 122 is rotated by 90° in the direction of the arrow R. The flyer 42 rotates in the direction of the arrow Q to wind a second polarity coil 48. Thereafter, the coil 48 is accepted into the coil accommodating space 46a. Then, the coil accepting jig 122 rotates by 90° in the direction the arrow R and the flyer 42 rotates in the direction of an arrow M to form a third polarity coil 48. Thereafter, the coil 48 is accepted into the coil accommodating space 46a. Then, after the coil accepting jig 122 has been rotated by 90° in the direction of arrow R, the flyer 42 rotates in the direction of an arrow Q. Upon completion of the winding operation of a fourth polarity coil 48 round the spool 43, the flyer 42 stops at the position of D to extend the electric wire 45 from the coil 48 to the nozzle 44. When the hook lever 86 is rotated by 180° in the direction K to move to the position of the B, the electric wire 45 is caught by the hook 86a. The hook draws the electric wire between the clamp edges 60 and 61, the shaping portions 54a, 56a and 55a, 57a, and cutting edges 62 and 63, each of these edges being open as shown in FIG. 5, to come to the position of B thereby to form two end portions 120 and 121. Then, the cutting arms 52 and 53 are closed to cut off the end portion 120 by the cutting edges 62 and 63 and to clamp it by the clamp edges 60 and 61. The end portion 120 becomes the leading end portion 4a of the next auxiliary coil 4. The end portion 121 becomes the trailing end portion 3b of the just wound auxiliary coil 3. Thereafter, upon closing of the forming levers 54 and 55 as shown in FIG. 7, each of the end portions 120 and 121 is shaped into a single convex portion (see FIG. 10). The operations of these forming levers 54, 55, 56 and 57 can be controlled to shape from 0 to 2 convex portions in the end portions 120 and 121. The end portion 121 slips from the cutting arms 52 and 53 upon the rotation of the coil accepting jig. Similarly, the auxiliary coil 4 is placed on the auxiliary coil 3 for the winding operation. The end portions 120 and 121 are provided, respectively, with two convex portions by the operations of the forming levers 54 and 55 and the forming levers 56 and 57 as shown in FIG. 8. Similarly, the auxiliary coil 5 is placed on the auxiliary coil 4 for the winding operation. The end portions 120 and 121 are provided, respectively, with no convex portions, since the forming levers 54 and 55 and the forming levers 56 and 57 are not operated as shown in FIG. 6.

According to the coil end shaping method for electric appliances and the apparatus therefor in accordance with the present invention, convex portions are formed in the end portions of a plurality of types of coils. The number or different shape of the convex portions in each coil is selected to simplify the distinguishing of the plurality of end portions extending out of each coil from each other and to prevent wiring errors in the connection of the end portions. Alternatively the same number of convex portions are provided in coil ends of different types of coils which are to be connected to each other so that the wiring operation can be correctly and efficiently performed.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method of shaping coil ends of at least one coil of an electric appliance, comprising the steps of shaping the coil ends into respective different shapes to distinguish the coil end portions from each other.

2. The method as claimed in claim 1 wherein the steps of shaping comprise shaping the coil ends into different numbers of convex or concave portions.

3. The method as claimed in claim 2 in which there are a plurality of coils, and the number of the convex portions or the concave portions is different for the ends of the respective coils.

4. The method as claimed in claim 1 in which there is a plurality of coils to be connected, and the trailing ends of the preceding coils are shaped in the same shape as the leading ends of the succeeding coils.

5. The method as claimed in claim 4 in which the steps of shaping comprise shaping the coil ends into different numbers of convex or concave portions.

* * * * *